UNITED STATES PATENT OFFICE.

CARLETON ELLIS, OF MONTCLAIR, NEW JERSEY.

PROCESS OF MAKING CATALYZERS.

1,156,674. Specification of Letters Patent. Patented Oct. 12, 1915.

No Drawing. Application filed June 30, 1915. Serial No. 37,244.

*To all whom it may concern:*

Be it known that I, CARLETON ELLIS, a citizen of the United States, and a resident of Montclair, in the county of Essex and State of New Jersey, have invented certain new and useful Improvements in Processes of Making Catalyzers, of which the following is a specification.

This invention relates to duplex or composite catalyzers and to the process of making same and is directed especially to the production of catalytic material adapted for the hydrogenation of oils containing unsaturated constituents.

This application is based on matter disclosed in or derived from my copending application Serial No. 679,771 filed Feb. 24, 1912.

The catalytic material consists of or may comprise two or more catalytic agents, one of which may be of a metallic or metal containing character and the other is preferably of an organic or combustible nature which may be readily eliminated by roasting when the metal catalyzer has become spent so that the metallic material may be obtained as a residue which may be readily recovered, thus avoiding the presence of a great bulk of refractory material to complicate the operation of regeneration such as is urged against the use of catalyzers prepared with mineral substances of a refractory nature, such as asbestos, pumice, kieselguhr, clay and the like. For the purposes of the present invention and especially as regards a duplex catalyst, the catalytic agents may be termed the primary and secondary catalyzing bodies. As a primary catalytic agent I preferably employ a metallic body, alloy or compound or metal bearing compound of the nature of nickel, cobalt, copper and the like or the rare metals such as platinum and palladium or mixtures of these various metals. Preferably nickel is the primary catalytic agent employed as it is both active and efficient and cheap. As the secondary catalytic agent or coöperative hydrogenating body I preferably use charcoal which preferably should be as pure as possible and furthermore in common with all catalyzers of marked activity should be in a fine state of subdivision and this degree of extension or comminution may be secured by grinding the charcoal very fine and if desired subsequently putting it through the operation known as air floating by which a product of great fineness having a considerable proportion of its particles passing two hundred mesh screen may be obtained. Charcoal in this finely-divided state like nickel in a similar extended condition is active in occluding hydrogen and coöperates with the nickel material to rapidly effect the hydrogenation of the unsaturated constituents of fatty oils and the like. Preferably the charcoal is largely of at least 100 mesh fineness and if the major portion of the particles pass 200 mesh a highly desirable coöperative effect is obtained.

The charcoal may be purified by washing with dilute nitric or other acid and also in some cases with alkali so as to remove undesirable mineral matter, sulfates and other catalyzer poisons and so forth; finally washing thoroughly with distilled water, thereby obtaining a good clean material. Metallic or other coöperating catalytic agent is then incorporated with this material. For this purpose I preferably take basic nickel such as nickel hydroxid which is preferably freshly prepared in a state of purity, dissolve this in concentrated ammoniacal solution and treat the charcoal with the solution. Only approximately enough ammonia is used to dissolve the nickel hydrate and the quantity of the latter with reference to the amount of the charcoal is preferably proportioned to give a product having from ten to thirty per cent. of nickel. Preferably, however, a relatively small proportion of nickel is employed, so as to secure the occluding effect of the charcoal in as high degree as possible which is of advantage in treating oils, especially when the catalyzer is suspended in the oil and the latter hydrogenated by the passage therethrough of a strong current of hydrogen. In this respect charcoal has advantages over mineral substances which are substantially heavier.

All that is necessary after the basic nickel solution and the charcoal have been incorporated is to dry the material when the ammonia and moisture evaporate and the product is reduced with hydrogen or other reducing gas or vapor, preferably with agitation and preferably at a temperature between 300–400° C. After reduction the product ordinarily should not be allowed to oxidize.

So prepared, a highly efficient catalytic agent is obtained free from catalyzer poisons and having nickel in intimate contact with active charcoal which likewise serves to absorb or occlude hydrogen and co-operates with the nickel material in the catalytic process in a most advantageous manner. The charcoal does not impart to edible oils that clayey flavor which often is noticed when using an earthy mineral support and is thus advantageously used in hydrogenating edible oils.

What I claim is:—

1. The process of making catalytic material which comprises dissolving pure nickel hydrate in ammonia, incorporating air floated charcoal therewith, drying and reducing with hydrogen.

2. The process of making catalytic material which comprises dissolving pure nickel hydrate in ammonia, incorporating demineralized and air floated charcoal therewith, drying and reducing with hydrogen.

3. The process of making catalytic material which comprises dissolving pure nickel hydrate in an aqueous ammoniacal solvent, incorporating finely divided charcoal therewith, drying and reducing with a reducing gas.

4. The process of making a catalyzer adapted for hydrogenating fatty oils which comprises dissolving nickel hydroxid in an aqueous ammoniacal solvent with finely-divided charcoal material, in heating to eliminate ammonia and reducing the hydrate to the metallic state and charging the charcoal with hydrogen.

5. The process of making a duplex catalyzer which comprises mixing a basic solution of nickel material free from catalyzer poisons or salts with pure finely-divided charcoal material, drying and reducing the basic nickel material substantially to the metallic state.

Signed at Montclair in the county of Essex and State of New Jersey this 28th day of June 1915.

CARLETON ELLIS.